United States Patent [19]
Hahn

[11] Patent Number: 4,508,998
[45] Date of Patent: Apr. 2, 1985

[54] BRUSHLESS DISC-TYPE DC MOTOR OR GENERATOR

[75] Inventor: James H. Hahn, Fort Lauderdale, Fla.

[73] Assignee: David H. Rush, Hollywood, Fla.

[21] Appl. No.: 232,810

[22] Filed: Feb. 9, 1981

[51] Int. Cl.³ .......................................... H02K 29/00
[52] U.S. Cl. .................................. 318/138; 318/254; 318/439
[58] Field of Search ............... 318/138, 254, 254 A, 318/439; 310/261, 262, 45, 268

[56] References Cited

U.S. PATENT DOCUMENTS

| | | | |
|---|---|---|---|
| 3,699,372 | 10/1972 | Abe et al. | 310/268 |
| 3,766,456 | 10/1973 | Carow | 318/138 |
| 4,207,483 | 6/1980 | Baer | 310/49 R |
| 4,217,508 | 8/1980 | Vznka | 310/46 |

FOREIGN PATENT DOCUMENTS 2718428 11/1977 Fed. Rep. of Germany .
1436716 of 0000 United Kingdom .

OTHER PUBLICATIONS

German Application No. 2423665 laid open to public inspection Dec. 5, 1974, Deval et al., FRG Offenlegungschrift.

*Primary Examiner*—J. V. Truhe
*Assistant Examiner*—Saul M. Bergmann
*Attorney, Agent, or Firm*—Darby & Darby

[57] ABSTRACT

A brushless, preferably coreless, disc-type DC motor or generator characterized by a positive, unidirectional, nearly constant torque is disclosed. The machine in a preferred form comprises a rotor disc mounted for rotation with the shaft and a stator fixedly mounted in coaxial parallel relation to the rotor. The stator contains at least two interleaved sets of coils, with the sets of coils adapted to be alternately energized for current flow in the same direction in the plane of the stator to generate axially extending magnetic fields all of the same polarity. The rotor disc carries in a circular array at least one permanent magnet, asymmetrically shaped in relation to the shape of the stator coils, each having a tip portion and a base portion; and with a magnetic field of common polarity extending in the same axial direction as the magnetic fields of the energized coils. When the tip portions of the magnets are aligned with a first set of coils, that set is energized to create a torque on the rotor. The magnets rotate until the tip portions become aligned with the adjacent set of coils, which are then energized as the first set of coils are simultaneously de-energized. This sequence is continuously repeated to provide a nearly constant output torque.

26 Claims, 14 Drawing Figures

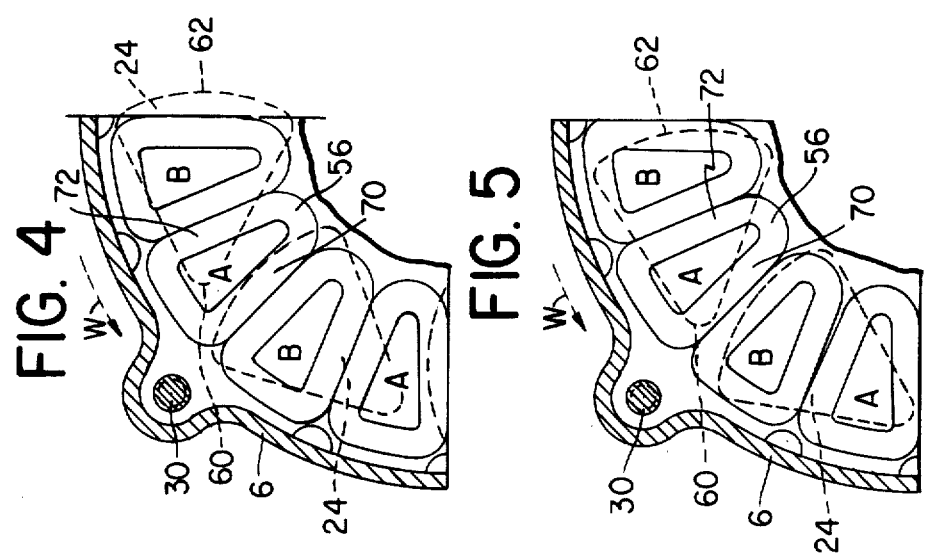
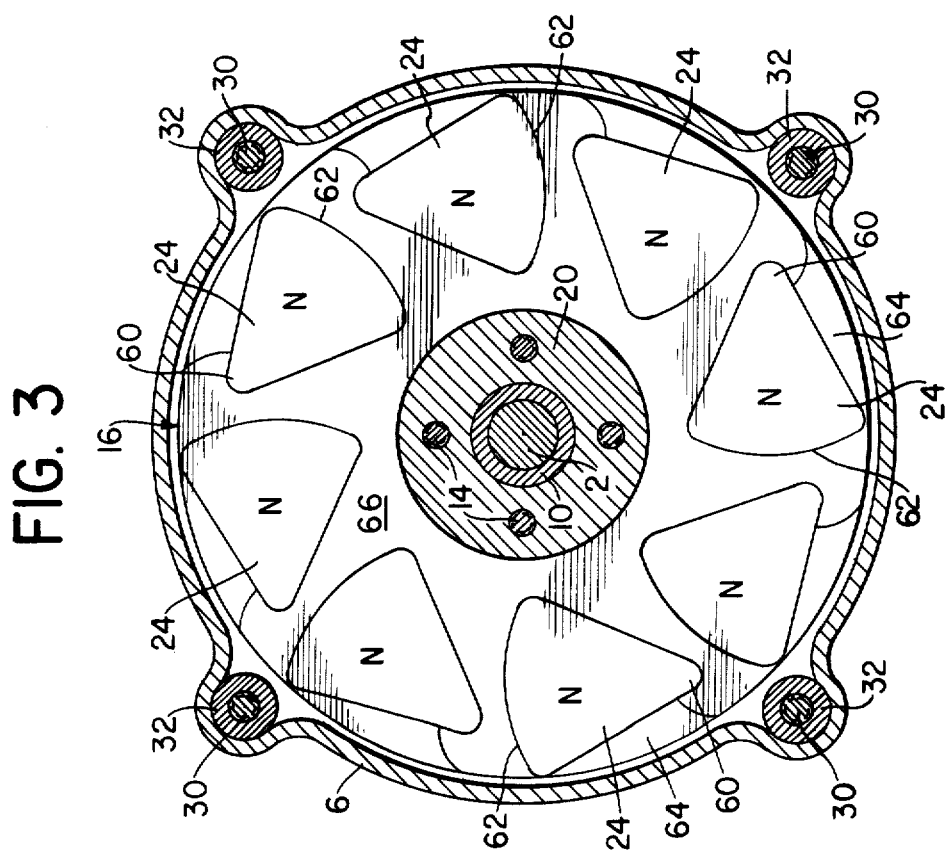

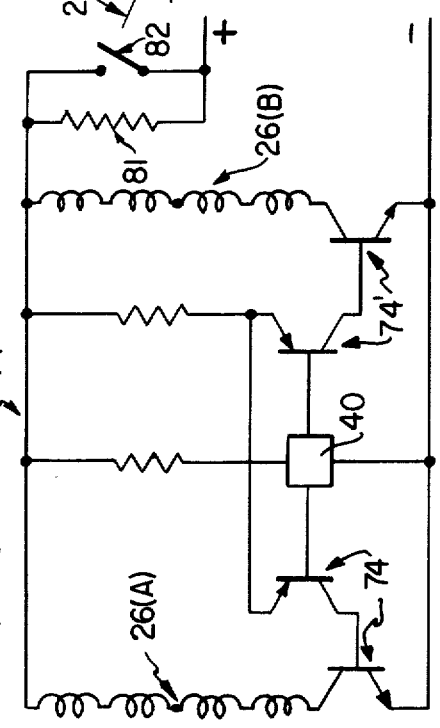
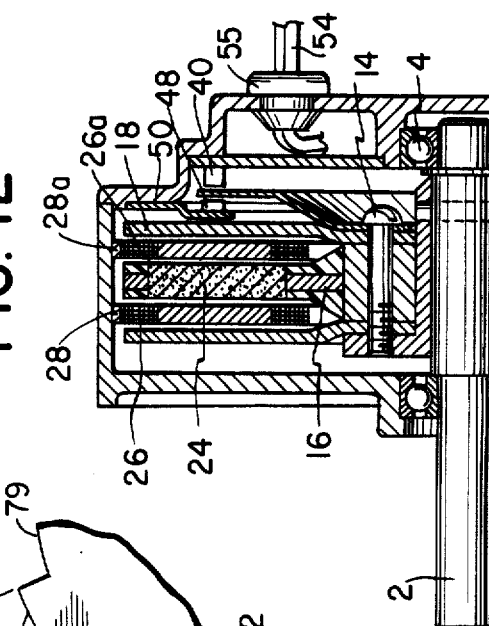
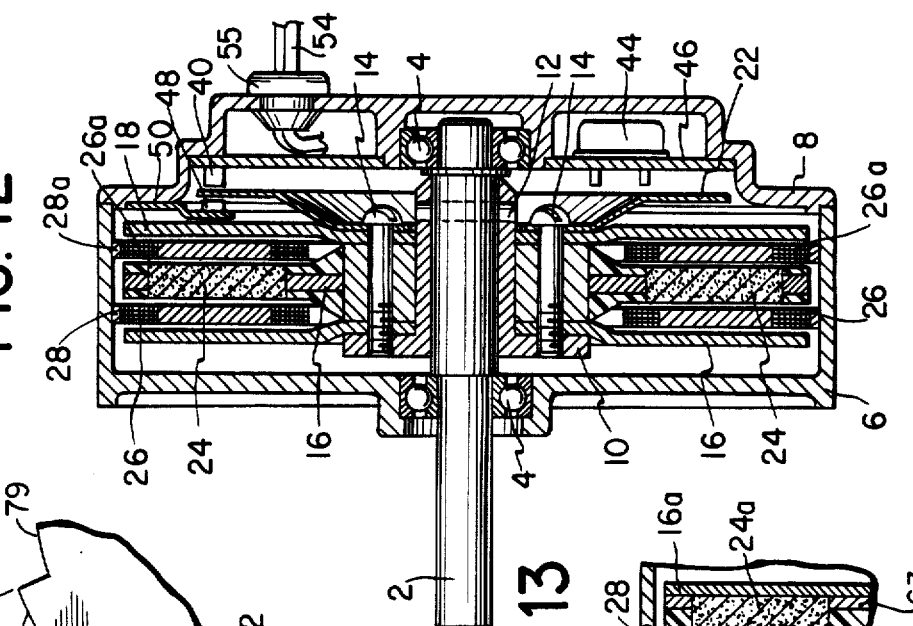
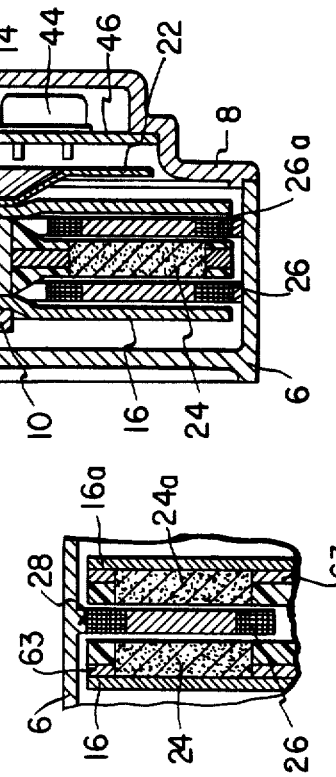
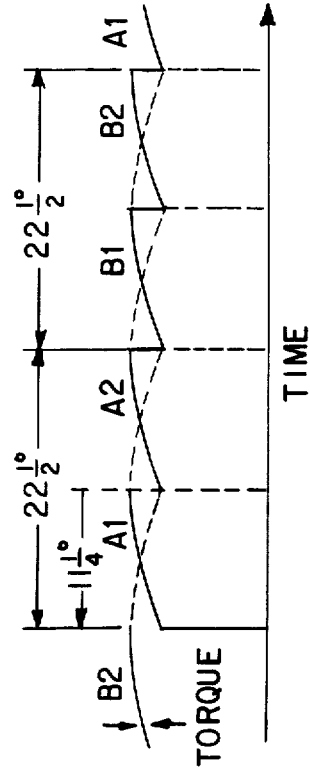

BRUSHLESS DISC-TYPE DC MOTOR OR GENERATOR

BACKGROUND OF THE INVENTION

This invention relates to a brushless, disc-type DC electrical machine, such as a motor or generator, having two relatively rotatable elements (i.e. stator and rotor), and more particularly to such a machine where interleaved sets of planar coils on one of said elements, having current flowing in the same clockwise or counterclockwise direction in the plane of the element, are alternately energized to create a positive, nearly constant, unidirectional torque with respect to the other element carrying at least one permanent magnet, the one element being mounted on the machine shaft in coaxial alignment with the other element, and the permanent magnet or magnets are asymmetrically shaped in relation to the aligned coils, and have the same direction of field or polarity facing the coils. For convenience in the following, the invention will be descirbed as a DC motor with permanent-magnet rotor, although not so limited.

Various types of brushless DC motors have been previously proposed. These motors generally exhibit significant undesirable torque fluctuations, and if the motor comes to rest in certain positions, a dead spot occurs and no torque is delivered. Auxiliary starting means are therefore required. In addition, these motors require numerous coil switching circuits for energizing the desired set of coils and multiple position-sensing devices for detecting the positions of the coils relative to the magnets in order to switch current to the desired set of coils. As a result, these motors are complicated in design, heavy in weight and proportionately high in cost.

The DC motor descirbed in U.S. Pat. No. 4,217,508 issued to Mitsu Uzuka is a prior art attempt to solve the cost disadvantage of prior brushless DC motors and to create a torque which exhibits little fluctuation and avoids dead spots. As in all the prior art brushless DC motors, each coil in this motor has current flowing in a direction opposite to the direction of current flow in the adjacent coil. As a result, the magnetic field produced by the energized coils has both north and south polarity facing the magnets. The magnets also have both north and south polarity facing the coils.

DC motors of this type are generally useful for low horsepower, constant drive applications, such as for video tape recorders, video disk players, audio tape recorders and the like. Particularly when this type of motor is operated at high efficiency and larger horsepower, greater than about one to two horsepower, demagnetization of the permanent magnets may occur. Not only is this demagnetization the result of mechanical jarring of the magnets or exposure to heat during use, but also such demagnetization may result from the fields produced by the coils; for example, when the electric currents in the coils are larger, as during start-up or very large loads, the magnetic fields produced by the coils may oppose the field of the magnet, and tend to demagnetize the magnet, or even magnetize it in a reverse polarity. In most motors, the current in the coils is at least during certain periods in a direction which produces this demagnetizing action. As the operating time increases, such demagnetization may produce a harmful effect on the magnitude of the delivered torque.

Another disadvantage of the Uzuka device is his preferred use of a toroidal stator core on which the coils are wound. This arrangement limits the number of turns of the coils which can be used in a particular size motor for a given air gap between the coils and the magnets. The use of a toroidal core necessitates a larger housing and heavier motor for the same electromotive force. The use of toroidal stator cores is also disadvantageous since it results in eddy current and hysteresis losses. These losses lead to heat build-up in the motor limiting the output, efficiency and operating life of the motor.

OBJECTS OF THE INVENTION

Therefore, it is an object of the present invention to produce an improved DC electrical machine of decreased weight and cost which avoids the problems of prior art DC electromechanical machines.

Another object of this invention is to provide a DC electrical machine which produces a positive, unidirectional, nearly constant, torque without reversing the magnetic field of the energized coils, avoiding the disadvantage of demagnetization.

A further object of this invention is to provide a brushless, coreless DC electrical machine with reduced hysteresis and eddy current heat build-up, and reduced windage friction losses, suitable for high speed operation.

SUMMARY OF THE INVENTION

In accordance with the invention, a brushless, preferably coreless, DC motor or generator comprises a disc-type rotor element mounted for rotation on a shaft with respect to a stator element, one of said elements carrying a magnet or a circular array of permanent magnets, generally triangular in shape having a tip portion and a base portion, for providing one or more magnetic fields all of like polarity in the axial direction; the other element being coaxial with and in parallel relation to the first element, and carrying at least two spatially alternating sets of coils, coplanar with the second element, each set of coils being adapted to have current flowing in the same direction in the plane of the second element to generate magnetic fields all of the same polarity and in the same axial direction as the permanent magnet fields. The current in one set of coils is flowing at the time that the current in the other set is not flowing, so that the current alternates between the two sets of coils. By this arrangement, the first and second motor elements are caused to rotate relative to one another with a positive, unidirectional, nearly constant, torque applied to the motor shaft.

In a preferred embodiment of the invention the rotor mounted on a shaft comprises eight permanent magnets, each of generally triangular shape, with a tip portion extending generally normal to the radial direction of the rotor, and a base portion extending in a generally radial direction, and the stator comprises sixteen coils, eight in each set of two interleaved sets, the coils being generally pie-segment shaped with the tips of the coils directed radially toward the shaft, all the coils being wound for current to flow in the same direction in the plane of the stator so that, when the tip portions of the generally triangularly shaped permanent magnets are aligned substantially with the centers of one set of coils, and that coil set is energized to produce magnetic fields all of the same polarity extending in the same axial direction as the magnetic fields of the permanent magnets, an attractive force on the permanent magnets results, delivering a torque to the rotor and shaft. The rotor and permanent magnets then move through an angle of rotation of 22½ degrees, (equal to 360 degrees divided by the total number of coils), until the tip portions of the magnets becomes aligned substantially with the centers of the non-energized set of coils, whereupon the non-energized set of coils is then energized, and the first set of coils is de-energized, causing the rotor to continue to rotate and deliver a nearly constant, positive, unidirectional torque to the shaft, until the magnets again become substantially aligned with the first set of coils, which is then energized and the second set of coils is deenergized, with this cycle repeated to continue the rotation in the same direction.

The DC motor or generator according to the invention is compact, lightweight, low in cost, produces a smooth, nearly constant, unidirectional torque, provides a long operating life and low heat build-up when operating at high speeds (which may be on the order of about ten thousand revolutions per minute), and has high efficiencies (on the order of 75 to 85 percent) while delivering power at around 1 to 2 horsepower. Further, due to the configuration of the rotor and stator and the same non-reversing magnetic field polarity produced in all the coils, the problem of demagnetization is avoided.

BRIEF DESCRIPTION OF THE DRAWINGS

The following detailed description of a preferred form of the invention will be best understood in conjunction with the accompanying drawings in which:

FIG. 3 is a transverse cross-sectional view of the device of FIG. 1 taken along the line 3—3 of FIG. 1 perpendicular to the axis of the motor shaft, and showing the rotor disc and permanent magnets;

FIGS. 4-7 are fragmentary views diagrammatically representing portions of the stator ring assembly with dotted representation of the rotor disc magnets superimposed thereon, in differing relative positions of stator and rotor;

FIG. 9 is a fragmentary cross-sectional view of the timing wheel 22 of FIG. 1 taken along line 2—2 of FIG. 1 perpendicular to the axis of the motor shaft showing the projections angularly spaced at 22½ degrees.

FIG. 11 is a schematic circuit diagram of alternate switching circuits to reduce in-rush current to the coils upon energization.

FIG. 12 is an axial cross-sectional view of another embodiment of a DC motor in accordance with the present invention;

FIG. 13 is a fragmentary axial cross-sectional view of another embodiment of a DC motor in accordance with the present invention containing a double-rotor, single-stator configuration.

FIG. 14 is a graph showing the approximate torque pattern of an alternate embodiment of a single rotor-double stator DC motor of the present invention.

DETAILED DESCRIPTION OF A PREFERRED EMBODIMENT

Figure 1:
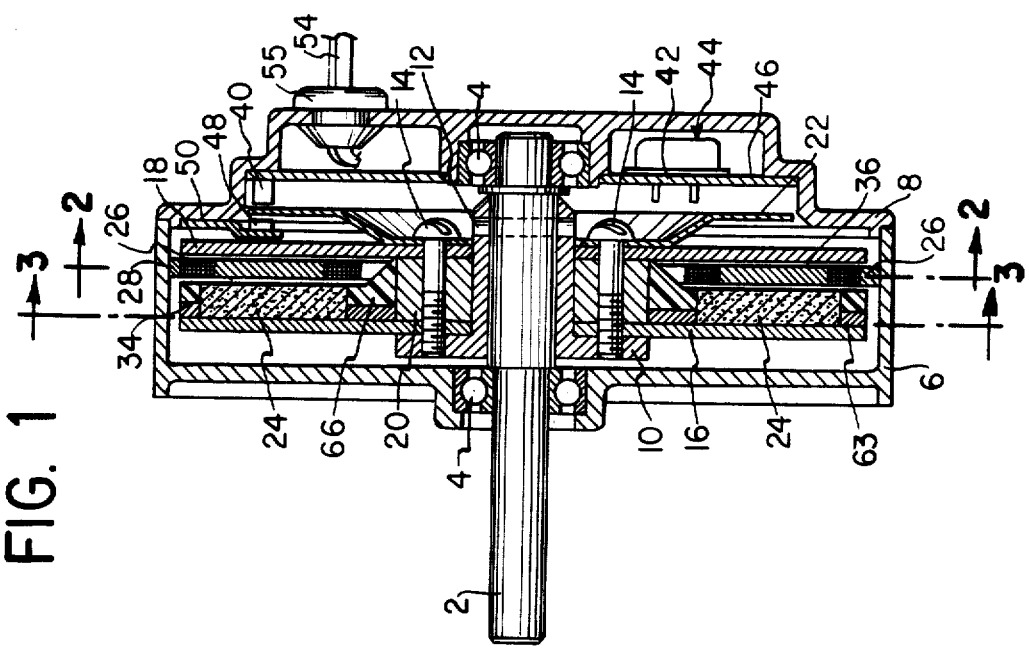
FIG. 1 is an axial cross-sectional view taken along the line 1—1 of FIG. 2 illustrating one embodiment of a DC motor in accordance with the present invention.

FIG. 1 shows an axial cross-sectional view of an electromagnetic machine embodying the present invention. Such a machine may serve either as a motor or generator, but for simplicity, the description will be directed to a motor.

In this machine, rotatable shaft 2 is mounted on bearings 4 along the center line of housing sections 6 and 8. A metal collar 10 is suitably fastened, as by pin 12, to shaft 2. Secured to the collar 10, as by screws 14, is a rotor having a first ferro-magnetic circular disc 16 and a second ferro-magnetic, circular disc 18 held in parallel spaced relation to the first rotor disc 16, as by a ferro-magnetic cylindrical spacer 20, which is also secured to collar 10, as by screws 14, and which may have a diameter substantially equal to that of collar 10. Also attached to disc 18, on its side opposite from spacer 20, is a circular timing wheel 22. One or more permanent magnets 24 are mounted on rotor disc 16. Any desired number of magnets 24 may be used, whether odd or even, preferably eight being used in the example being described. The configuration of the permanent magnets 24 and the method of mounting the magnets on rotor disc 16 will be described in detail with reference to FIG. 3.

A ring-shaped stator 28 is secured, as by screws 30 (shown in FIG. 2) and spacers 32 (shown in FIG. 3), to one of the housing sections 6 or 8. The stator ring 28 is positioned between rotor discs 16 and 18, leaving a first air gap 34 between rotor disc 16 and stator ring 28 and a second air gap 36 between stator ring 28 and second rotor disc 18. These air gaps may have widths on the order of twenty-five to fifty thousandths of an inch.

Two sets A and B of coils 26 joined together form the flat stator ring 28. The number of coils is preferably at least twice the number of magnets 24. The coils of set A are interleaved with those of set B, so that the sequence of coils around stator 28 is alternately coil A, coil B, coil A, coil B, etc. The method of joining the coils 26 to form the stator ring 28 will be described with reference to FIG. 2.

Each magnet 24 is magnetized transversely so that one face, adjacent to the coils, has a given polarity (e.g., south) while the opposite face, juxtaposed to the rotor disc 16, has opposite polarity (i.e., north). A continuous magnetic path is formed from one face (i.e. pole) of each magnet 24, across air gap 34, through the oppsoed coil or coils 26 on the stator ring, across the second air gap 36, radially along the second rotor disc 18, axially through spacer 20, radially along rotor disc 16, and back to the opposite face or pole of magnet 24.

A position-sensing device 40, such as a photocell or a Hall effect device, is mounted on housing section 8 in any suitable manner. The position-sensing device 40 is wired to a coil switching circuit 44 (in a circuit shown in FIGS. 10 or 11, and described below), which is also mounted on housing section 8, as by a bracket 46. An energy source 48 for the position-sensing means 40 is mounted on housing section 8, as by bracket 50. The energy source 48 is positioned on the opposite side of the timing wheel 22 from the position-sensing means 40. The timing wheel 22 has radially extending projections which are angularly spaced, and in certain positions of wheel 22 block sensor 40 from source 48, as discussed below.

Vent openings 52 (shown in FIG. 2) in the stator 28 help provide convection cooling for the housing 6, 8.

The power supply leads 54 for the coils 26 pass through an opening in the housing section 8 and are insulated from the housing as by insulator 55.

Figure 2:
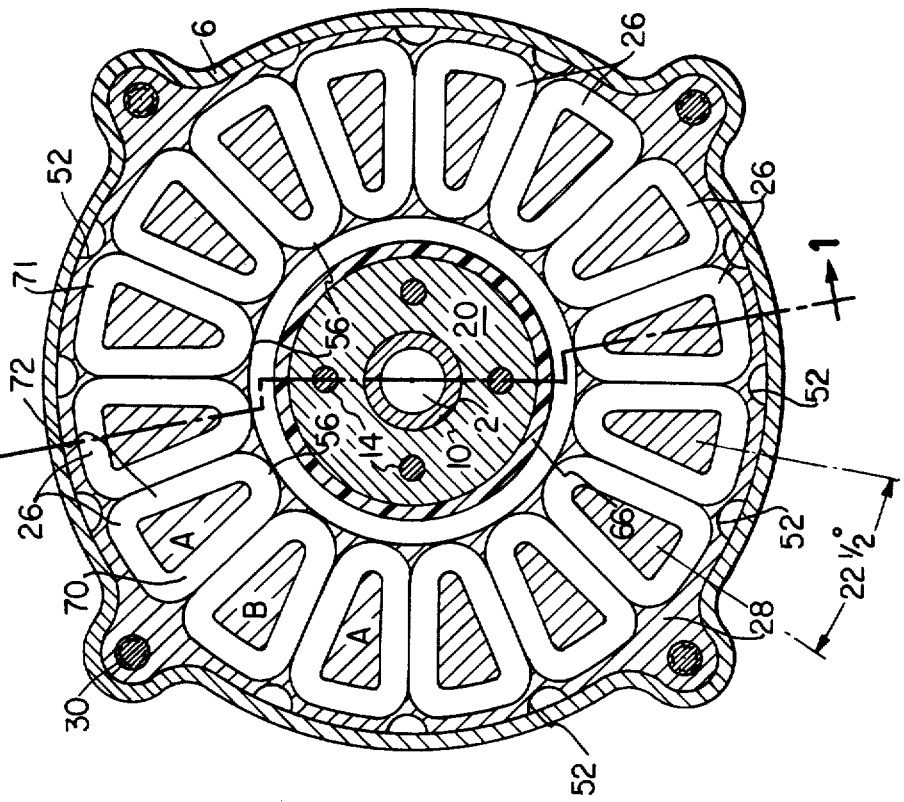
FIG. 2 is a transverse cross-sectional view of the device of FIG. 1 taken along line 2—2 of FIG. 1 perpendicular to the axis of the motor shaft, and showing the stator and the two interleaved sets of coils.

The construction of the stator 28 and the position and joining of the coils 26 to form the stator 28 will be better understood by referring to FIG. 2 which shows the stator 28 in a plan cross-sectional view taken along line 2—2 of FIG. 1. The coils 26 are arranged on the stator in a circular array equidistant from the shaft axis. In this preferred embodiment each coil is substantially triangular or pie-segment-shaped, with straight sides 70 and 72, and an arcuate outer portion or base 71, with rounded corners joining those sections, the inner tip 56 being directed toward the center of the stator ring 28 and the shaft 2. While other configurations of the coils 26 are also operative, for a given number of coils the pie-segment-shaped configuration shown allows a maximum area for each coil.

Each coil is formed of one or more turns with the plane of the coil parallel to or in the plane of the stator ring. Preferably the coils are non-overlapping and multi-turn, with the same number of turns in each, and wound in the same direction (i.e., all clockwise or all counterclockwise). As mentioned above, the stator 28 contains two sets A and B of coils 26, the coils of the sets being interleaved or spaced alternately around the stator ring 28. The coils of each set A or B are preferably connected in series, or otherwise arranged (e.g. in parallel or series-parallel) to have the same current magnitude in each. In this preferred embodiment sixteen coils are used, eight in set A and eight in set B. The coils of each set are preferably equally angularly spaced, with the center of each A coil separated from the center of each adjoining B coil by 360 degrees divided by the total number of coils (e.g. twenty-two and one-half degrees for 16 coils).

In assembling the stator, the coils 26 are individually wound and placed on the stator 28 in their desired positions, and are then permanently fixed in their positions on the stator 28 in an appropriate manner. One preferred method for fixing the coils 26 to the stator 28 is to coat the coils with a heat sensitive non-conducting and non-magnetic thermosetting adhesive material which upon the application of heat or current to the coils fixes them together to form the stator. If desired, a thin disk (e.g. of fiber material) may be used as a support for the coils. Thereafter, any additional heat or current applied to the coils does not affect the already thermoset material, and the coils will not shift their relative positions. Since the coils 26 do not utilize a ferromagnetic core, hysteresis and eddy current losses are minimized. The only significant frictional losses which result in heat buildup in the motor are those which result from the rotation of the motor shaft 2 in the bearings 4 and windage. The motor is therefore capable of longer operating life and can withstand high speeds (up to about ten thousand revolutions per minute or more) without excessive heat build-up.

The construction of the first ferromagnetic rotor disc 16 and the shape and positions of the permanent magnets 24 are best seen by reference to FIG. 3. Eight permanent magnets 24, equal to one-half the number of coils 26, are preferably used, although the invention may use other numbers of magnets, not necessarily related in number to the number of coils. Up to at least 12 magnets would be practical in the system being described. The magnets are mounted in a circular array on the rotor disc 16, and are preferably generally triangular in shape. However, any shape may be used (such as trapezoidal or oval or oblate) which is asymmetric with respect to the shape of the coils, to function as described below. The magnets 24 may even have any of a variety of irregular shapes, so long as the assymmetrical magnet shape produces a magnetic flux pattern which is unbalanced relative to that of the coils 26 to function as discussed below. As shown below, the unbalanced magnetic flux pattern of the magnets is useful for maintaining a positive unidirectional torque without dead spots.

The magnets 24 preferably are individual pieces rather than a single magnetic (i.e. powdered iron or ceramic) ring with multiple poles. The individual pieces permit sharper shape profile, have less weight and have less inertia, and avoid the frangibility problem of a full magnet ring. The permanent magnets 24 in the preferred embodiment have the shape of isosceles triangles each having a tip 60 and a base 62, and with an axis substantially perpendicular to the radial direction. The tip 60 of one magnet 24 is shown to be separated from the base 62 of the adjacent magnet 24; however, the tip 60 of one may be joined to the base 62 of the adjacent magnet, although this is not preferred. The separated configuration is preferred since the magnets are then easier to manufacture and are less frangible than larger or one-piece multi-pole permanent magnets. As seen in FIG. 3, each magnet tip 60 is pointed toward the outer portion of the base 62 of the adjacent magnet, rather than toward its center. The tip 60 to base 62 to tip 60 pattern of the magnets 24 is repeated in a circular array around the axis of the rotor disc 16. The magnet shape need not be exactly isosceles in shape, or have straight sides, for example, the tip portion of the magnets 24 may be more elongated than those shown in FIG. 3, or more blunted to regulate the torque pattern, as discussed below.

The magnets 24 are preferably positioned on the rotor disc 16 with one corner of the base 62 adjacent the outer circumference of the rotor disc 16. The base 62 of each magnet is also preferably rounded, as shown. This rounded base 62 is generally radially directed in the preferred embodiment to ensure that there always will be an area between the flat edges 70, 72 of the energized coil and the base 62 of the magnet 24. This will be discussed in more detail in reference to FIGS. 4-7. All corners of the permanent magnets 24 are preferably rounded as shown, to lessen the possibility of breaking or chipping. Also the shapes of the magnets 24 and the coils 26 may be interchanged so that the coils are asymmetrical in relation to the magnets.

As shown in FIG. 3, all magnets 24 have the same polarity, shown to be north poles on the sides facing upward from the plane of the view of FIG. 3. The use of a single polarity (either north or south pole) facing in the same direction for all the magnets is an advantageous feature of the invention. Since all the coils 26 have current flowing in the same (clockwise or counterclockwise) direction, creating magnetic fields facing in the same axial direction as that of the permanent magnets 24, the demagnetization of the permanent magnets, which otherwise might be produced by opposite direction of current in the coils is therefore avoided.

It is also possible but not preferred to have the current flow in all the coils in a direction to create a magnetic field facing in an axial direction opposite to that of the permanent magnets 24, so that the permanent magnets 24 are moved in the opposite direction from that in the preferred embodiment described above. In this case, a number of the advantages of the inventions may not be realized.

In assembling the rotor, in a preferred form, sheet 63 of a strong non-ferrous thermally stable material, such as aluminum or an aluminum alloy, is stamped out to form openings which conform to the shapes of the magnets 24. The sheet 63 is fixed (as by bonding) to the rotor disc 16 (as shown in FIG. 1) and the magnets 24 are inserted in the openings in sheet 63 and cemented to disc 16. The outer portions 64 of sheet 63 (see FIG. 3) help to lock the magnets 24 in place and prevent their slipping outwardly in response to centrifugal forces produced by the rapid rotation of the rotor disc 16. The thickness of the non-ferrous sheet 63 is preferably less than the thickness of the magnets 24. A thermosetting plastic material 66 is applied to the surface of the non-ferrous sheet 63 and around the magnets 24. This plastic material 66 smoothly fills in from the surface of the sheet 63 to the top surface of the magnets 24 so that no sharp edges of the magnets 24 are exposed. This plastic material 66 helps to fix the magnets in position and helps to reduce windage friction.

The functioning of the motor will be more readily understood from th diagram of FIGS. 4 to 7. FIG. 4 shows a superimposed view of the coils A, B and magnets 24 (shown dotted) in one position of the rotor disc 16 in relation to the stator 28. The tips 60 of the magnets 24 are shown to be in substantial alignment with the centers of the A set of coils 26. If coils A are now energized (with coils B not energized), the current flowing in coils A in the plane parallel to disc 16 sets up magnetic fields in a direction perpendicular to the plane of the stator 28 and parallel to the magnetic fields of magnets 24. In addition, the direction of current flow in each coil is selected so that the resultant magnetic field has the same direction as that of the cooperating magnet (e.g., the south pole of the magnet is facing the "north pole" of the adjacent coil). A magnetic attraction is thereby established between the energized coils 26 and the magnets 24 which attempts to align the magnetic axis of each coil A with that of the adjacent magnet 24, resulting in a torque on the rotor disc. In effect, the larger or base section 62 of each magnet 24 is attracted toward the center of the coil A on its left, in the counterclockwise sense as viewed in FIG. 4, to cause rotation in the direction of the dotted arrow W.

Considered from another viewpoint, the current flowing radially in coil side 72 interacts with the magnetic flux from magnet 24 (which extends in a direction perpendicular to the plane of FIG. 4) to produce a sideways force which causes a torque to develop on the first rotor disc 16, causing it, second rotor disc 18 and shaft 2 to rotate in direction W. At this moment, there is no current flowing through set B of the coils 26 and, therefore, there is no magnetic field established and no force exerted on the magnets 24 from deenergized coil set B.

Figure 8:
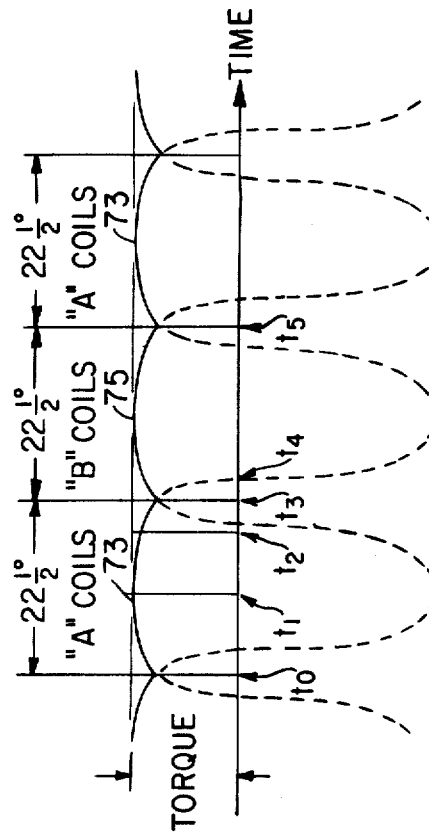
FIG. 8 is a graph showing the approximate torque pattern of the DC motor shown in FIG. 1 as it rotates in accordance with FIGS. 4-7.

The magnets 24 and rotor disc 16 thus rotate in direction W to move the magnet to a position such as shown in FIG. 5. At this position, a larger portion of magnet 24 interacts with coil side 72, increasing the torque on the rotor. However, at the same time the magnets 24 have become subjected to a second opposite force or back torque caused by the interaction of the oppositely flowing current of side 70 of the coil A with the tip area 60 of the magnet 24. This back torque is much smaller than the forward torque in direction W, being created by the interaction of the magnet 24 with side 72 of the coil A, due to the smaller magnet area at its tip 60 engaging the side 70 of the coils A, as compared with the larger area nearer base 62 of the magnet engaging side 72 of the coils A. The effect is to flatten the torque curve from a conventional sine curve, as shown in FIG. 8.

In this figure, it is assumed that the current is initiated in coil A at time $t_o$, when the relative positions are as in FIG. 4. The torque is then as shown by curve 73, at point $t_o$. At $t_1$ the positions are substantially as in FIG. 5, and as seen the torque versus time curve is generally flatter than at $t_o$. The magnet 24 and rotor, therefore, continue to rotate in direction W.

Figure 6:
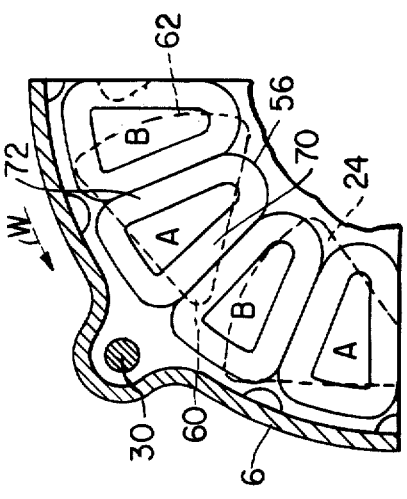

When the tips of the magnets reach the position shown in FIG. 6, the portion of each of the magnets 24, with which side 72 of the coils A is interacting, is slightly larger as compared to FIG. 5, while the tip area of the magnets 24 subjected to the back torque from side 70 of the A coil has been more markedly increased, as compared with FIG. 5. The active magnet portion engaging coil side 72 is still greater than the active magnet portion engaging coil side 70, and the magnets 24 and rotor disc 16 continue to rotate in direction W, but the torque drops off slightly, as at $t_2$ in FIG. 8.

At this point, the forward torque created by interaction between coil side 72 and magnet 24 is still greater than the back torque from interaction of coil side 70 and the narrower portions of magnet 24. In the preferred embodiment of the magnets 24, as shown in FIG. 3, the magnets have rounded bases. The rounded base ensures that while the coil is energized, between times $t_o$ and $t_3$, there will be a portion of the magnet to which the flat side 72 of the coil is attracted. If the base of the magnet were flat, a dead spot could occur when the base of the magnet is aligned directly with coil side 72. Despite the existence of the rounded base, the area between side 72 of the energized coil and the base of magnet 24 is rapidly diminishing, and would create a dead spot (zero torque) and reversal if continued without change, to a point such as $t_4$ and thereafter along the dashed curve of FIG. 8.

Figure 7:
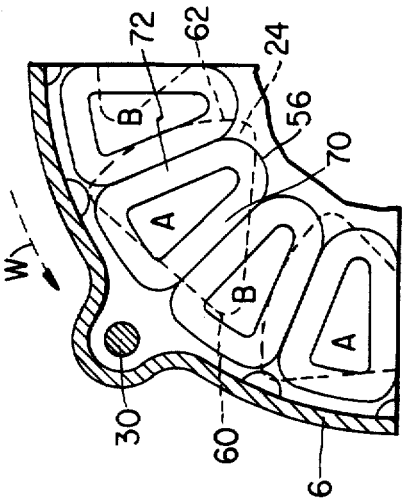

At the position shown in FIG. 7, the magnets 24 have traversed about 180 electrical degrees from the position shown in FIG. 4. The tip 60 of each magnet 24 is now substantially in alignment with the center of a coil of set B, in the same relative position as that previously between magnets 24 and coils A in FIG. 4. If at this moment the current is switched from coils A to coils B, the cycle from $t_o$ to $t_3$ would be repeated, as shown by curve 75 in FIG. 8. Thus, by switching the current from coils A to B or B to A every 180 electrical degrees, a nearly uniform torque, without dead spots, is produced, as shown by the solid-line curve in FIG. 8. It will be appreciated that this result is attained because of the shaping of magnets 24 in relation to coils 26. Variations in the shape of the torque curve of FIG. 8 can thus be made by changing the shape of the magnets 24 in relation to the coils 26.

Figure 10:
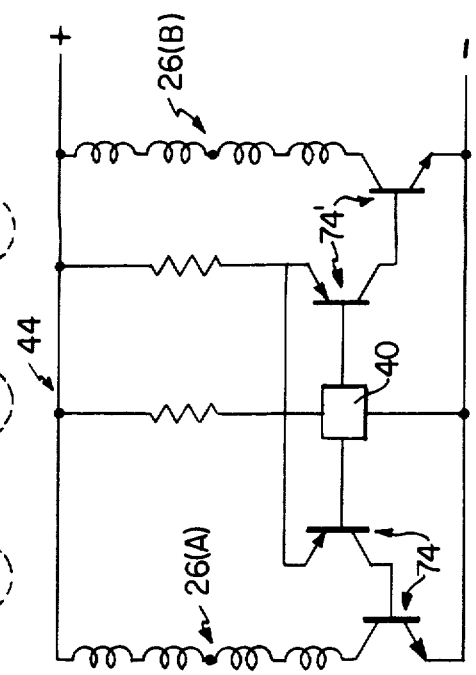
FIG. 10 is a schematic circuit diagram of a switching circuit useful with the present invention.

The desired switching of current from coils A to coils B and vice versa is accomplished by a switching circuit, such as that of FIG. 10, in conjunction with the energy source 48, sensor 40 and timing wheel 22.

As shown in FIG. 9, the timing wheel 22 is formed with a number of radially extending projections 77 which are angularly spaced around the circumference of the wheel and separated by gaps 79. The angular extent of a projection 77 plus its following gap 79 is equal to 360 degrees divided by the number of A coils or B coils. In the preferred embodiment with a total of 16 coils, therefore, each projection 77 and each gap 79 on the wheel 22 subtends twenty-two and one-half degrees.

As described in reference to FIG. 1, the timing wheel 22 is positioned between the sensor 40 and the source 48. The projections 77 of the wheel 22 block coupling between source 48 and sensor 40, while the gaps 79 allow the energy of the source 48 to activate the sensor 40. Thus source 40 is blocked for 22½ degrees, and allowed to activate sensor 48 for 22½ degrees, in this example. This switching action is synchronized with the position of the tip 60 of the magnets 24 so that as the tip 60 of the magnet 24 becomes substantially aligned with the center of coil set A or B, either a projection 77 or gap 79 of the timing wheel 22 is positioned either to cover or uncover the source 48, to cause the sensor 40 to switch the current between the coil sets A and B.

The source 48 may be any energy source which can be detected by an appropriate sensor 40. In one form the source 48 may be a light source, and the position sensing device 40 may then be a photocell. In the preferred embodiment of this invention, the source 48 is a permanent magnet and the position sensor 40 is a Hall effect pickup device, such as a Sprague UGN 301 9T. The timing wheel 22 is then of a ferro-magnetic material suitable for alternately allowing and preventing the magnetic field of source 48 from activating position sensor 40. This type of sensor device is essentially a single pole double-throw switch, which closes one circuit when activated and another when de-activated.

The activation of the position sensor 40 by the energy source 48 actuates a switching circuit 44, such as is shown in FIG. 10. The switching circuit 44 contains a Hall effect sensor device 40 which in one position (corresponding to a timing wheel interposed between source 48 and sensor 40) activates a pair of transistors 74, preferably in a Darlington-type circuit, connected to energize one set of coils 26A. In its other position (corresponding to a timing wheel gap 79 positioned to allow source 48 to activate sensor device 40) a similar transistor pair 74' directs current to flow through the other set of coils 26B.

In this way, the coil sets A and B are alternately energized. While each set is energized, it creates a torque on the magnets carried by the rotor. Just before that torque would otherwise diminish to an undesirable reduced value, (or begin to approach a dead spot) the current is switched to the other coil set, to continue the torque on the magnets, at a substantially uniform level.

In high efficiency motors such as the present type, the momentary starting current may be five to ten times the rated load current, to provide corresponding high starting torque. Such high starting currents in a system of the present type, would require the use of power transistors of a current-carrying capacity of about 300 to 600% of normal load current, since presently available power transistors are rated at only 50% above continuous duty rating for short periods such as 1 to 10 milliseconds during which the starting current surge normally occurs.

The oversized transistors are especially expensive for larger motors and are difficult to mount in motor housings of reasonable size. In addition, such transistors may limit the power rating for which motors may be designed.

To permit use of lower-capacity (and hence lower cost) power transistors, it has been found to be desirable to modify the switching circuit as shown in FIG. 10 to delay the current build-up and allow the motor to come to speed before the maximum current is produced. FIG. 11 shows a switching circuit which overcomes these difficulties, and permits the use of lower-power transistors in the system described above.

A resistor 81 in series with the power supply limits the voltage on the motor to 55 to 60 percent of normal for starting. The centrifugal switch 82 shorts out the resistance when the motor attains 45 to 50% of full load speed, and permits the use of transistors 55 to 60% smaller than normally required, while providing adequate starting torque of more than twice full-load torque. This resistor and centrifugal switch act to delay the in rush current on starting and allow the motor to come up to speed without an excessive current surge. A dashpot, magnetic or thermal time delay relay, set for 1 to 5 seconds of delay, could also be used with an appropriate resistor or rheostat or set of series resistors, instead of the resistor and centrifugal switch shown in FIG. 10.

The preferred embodiment of this invention has thus been described as operating on the principle of magnetic attraction between the magnet field produced by the current flowing in coils 26 and the field of the permanent magnets 24. If the current in all the coils 26 is caused to flow in the direction opposite to that in FIG. 2, or if all the magnets 24 shown in FIG. 3 have opposite polarity facing the stator ring 28, the forces produced by these magnetic fields would drive the rotor disc 16 and motor shaft 2 in a directin opposite to W. Each set of coils 26 will then be energized when the bases 62 of the magnets 24 come into substantial alignment with the centers of the set of coils 26 to be energized.

In one embodiment of the motor of this invention pursuant to FIGS. 1-9, its weight was approximately 3.95 pounds, in comparison with a conventional induction motor of comparable performance characteristics and operating life which weighs about 15 pounds. Since the cost of a motor is proportionately related to its weight, this motor of the present invention would be at least three times less expensive than a comparable conventional induction motor. This motor incorporating the present invention produced ¼ hp at 12 volts, with an efficiency greater than about 70%, at about 5000 to 6000 revolutions per minute. The starting current at 12 volts was 100 amperes, but was reduced to about 1 to 2 amperes during no-load operation. The starting torque was about 80% of full-load torque. If the size of the rotor and stator are increased to provide a power output greater than 1 hp., the efficiency of the motor will increase to about 75-85%.

At the present time the principal factor limiting the size of the present type of motor as a practical matter is the current capacity of the currently available transistors 74 for the switching circuit 44. The motor size is essentially not limited by frictional heat build-up, and may be designed for as little as 10 to 30% temperature rise at full load, with a maximum of 150 to 160 degrees.

The machine of the present invention is not limited to the 8 magnets and 16 coils as described in the preferred embodiment. Ten or twelve permanent magnets 24 may readily be used on the rotor disc 16, with twenty to twenty-four coils 26 on the stator 28, by making the coils 26 and the magnets 24 proportionally smaller, and by changing the subtended angle of the spaced projections 77 and gaps 79 of the timing wheel 22 to correspond to the angle between adjacent pairs of coils 26 equal to 360 degrees divided by the number of coils.

While the two sets of coils A and B are shown as preferably in the same plane, they may be in adjacent planes. For example, the two coils sets may be on opposite sides of a coil-carrying disk. Alternatively, the two sets of coils may be separated, one mounted on a stator element on one side of the rotor element, and the other on the opposite side of the rotor element. FIG. 12 shows an axial cross-section of such an alternate embodiment of the motor of the present invention. In this form, the motor has two stator rings 28 and 28a, each positioned on a separate side of a single rotor disc 16. The coils 26 on one stator ring 28 have current flowing in the same direction as the direction of current flow in the coils of the other stator ring. That is, the current in side 72 of a coil on stator 28 is in the same direction as the current in the similar side 72 of the aligned coil on stator 28a. On each stator 28 or 28a, the coils 26 are positioned in the manner shown in FIG. 2, with each coil A of stator 28 in alignment with a coil A of stator 28a. The single rotor disc 16 carries single set of permanent magnets 24 in a circular array as shown in FIG. 3; however, in this embodiment the magnets 24 extend through both sides of the ferro-magnetic rotor disc 16, exposing each magnet face to a respective set of stator coils. Thus rotor 16 interacts with the energized set of coils 26 (A or B) on stator 28, in the same manner as described in reference to FIGS. 4–7, delivering a torque on the rotor disc 16 in direction W. Similarly, the rotor 16 interacts with the energized set of coils 26 (A or B) of stator 28a in the same way to increase the torque in direction W. The corresponding sets A of coils 26, on both stators 28, 28a may be wired in the switching circuit 44 in series or in parallel, preferably with the same current magnitude in each coil; the same applies to the sets B of coils 26. Since both stators 28, 28a contain the same number of coils which have the same relative positions on the stator rings, a single position sensor 40, timing disc 22 and source 48 can be utilized in the same manner described with reference to the embodiment of FIG. 1. This double stator, single rotor configuration provides increased torque and power over the FIG. 1 embodiment. The power may also be increased by designing for greater rotor speed; thus, if the speed of the rotor is doubled, the horsepower is increased by a factor of four.

In another embodiment of the present invention, two rotors may be positioned on opposite sides of a single stator, as illustrated schematically in FIG. 13. In this case, the stator 28 carrying coils 26 is interposed between two parallel rotors 16, 16a. One rotor 16, on one side of stator 28, is essentially the same as in FIG. 1, while the other rotor 16a is essentially a mirror image of rotor 16a. Each rotor 16, 16a carries magnets 24 and 24a as in FIG. 1. However, while the polarity of the magnet faces on rotor 16 facing coils 26 may be as in FIG. 1, that of the magnet faces of rotor 16a facing stator 28 would be opposite. Thus, if north poles on magnets 24 of rotor 16 face coils 26, the magnets 24a on rotor 16a would have south poles facing coils 26. The coils are mounted on the stator ring in the same manner as in FIG. 1, so that the magnetic fields produced upon energization of each set (A or B) or coils 26 interact with the magnetic fields of the magnets on both rotor discs 24 and 24a in the same manner as as described above, to produce a forward unidirectional torque on the rotor discs. Only a single position sensor 40, source 48 timing wheel 22, and switching circuit 44 need be used, as in the case of FIG. 12.

As a modification of the present invention, the combination of single rotor and single stator as in FIG. 1, or single rotor and double stator as in FIG. 12, or single stator and double rotor as in FIG. 13, may be replicated axially along the shaft 2, so as to correspondingly increase the mechanical power produced. One advantage of this single layer of coplanar coils arrangement is that the gap between the coils and the adjacent magnets is kept to a minimum.

As another modification of the present invention, a single rotor-double stator configuration may be employed, similar to that shown in FIG. 12, which produces a torque pattern as shown in graph FIG. 14. However, in this form the positions of the stator coils of stator 26 are offset by 11¼ degrees from the positions of the coils on stator 26a. In this form, the coils are energized in the following sequence: Coil $A_1$ of stator 26, then coil $A_2$ of stator 26a, then coil $B_1$ of stator 26, then coil $B_2$ of stator 26a, and repeating the same cycle. The wheel 22 will now have projections and gaps angularly spaced 11¼ degrees apart, and any appropriate switching circuit can be used to switch the coils as described.

The foregoing illustrative embodiments of the present invention provide brushless, coreless, unidirectional DC motors with positive, nearly constant torque, which are lighter in weight and correspondingly less expensive than conventional DC motors. The motors have an efficiency greater than about 70%, even in small sizes, and long operating life comparable to conventional induction motors, as a result of reduced heat build-up due to the absence of brushes, coil core hysteresis, eddy current losses and windage friction loss. The special method of mounting the magnets on the rotor disc reduces windage friction and extends the life of the magnets under the centrifugal forces resulting from high speed operation. All the magnets have the same polarity facing the stator coils, which avoids the demagnetization inherent in prior art brushless DC motors. The power of the motor can be increased with the use of multiple rotor or stator configurations, or by replication of the arrangements described. Use of a single position sensor, sensing source, timing wheel and switching circuit provides nearly constant positive torque without dead spots. Alternate switching circuits can be employed, especially with larger motors, to enable reduction in back torque and to enable the use of smaller conventional transistors in the switching circuit.

It will be understood that in principle the magnets may be mounted on the stators and the coils on the rotors where desired, so long as their interrelationship remains as described. However, the extra complexity of electrically connecting to movable coils generally would make this arrangement less economical than the embodiment described above.

While the present invention has been described as a coreless motor, where the specific advantages of eliminating cores from the coils are not needed, magnetic cores (preferably of low-hysteresis and low-loss powdered iron) may be inserted within and/or outside the coils.

While the present machine has been described as a motor, which converts electrical energy to mechanical energy, it will be understood that the machine may be operated as a generator, by driving the shaft mechanically, to produce electrical energy from the windings.

It will be understood that the foregoing description of the preferred embodiments of the present invention is for the purposes of illustration, and that the various structural and operational features disclosed are susceptible of a number of modifications and changes without departing from the scope and spirit of the present invention, as defined in the appended claims.

What is claimed is:

1. An electrical machine comprising
rotor and stator elements,
the rotor element being mounted for rotation about an axis,
one of said elements including a coil arrangement having a plurality of sets of coils,
each set being in a substantially circular arrangement coaxial with and in opposed relationship to said other element,
each coil of each set being angularly offset from a coil of another set,
all said coils being wound in a direction to produce similarly oriented magnetic fields extending between said elements upon having current flow through the coils,
the other of said elements including a permanent magnet arrangement having a plurality of poles facing said coils and having magnetic fields extending between said elements,
all of said poles which face in the same axial direction having the same magnetic orientation,
each of said poles being positioned to face each of said coils sequentially as said rotor element rotates,
said coils and magnets being relatively shaped to provide a gradually varying magnitude of magnetic interaction therebetween as said coils and magnets have relative motion therebetween, and
a switching arrangement for rendering said sets of coils alternately conductive.

2. A machine as in claim 1 wherein said coils are part of said stator element and said magnet arrangement is part of said rotor element.

3. A machine as in claim 1 having said sets of coils which are substantially coplanar and are interleaved.

4. A machine as in claim 3 wherein said coils have radially extending coil sides.

5. A machine as in claim 4 wherein the coil sides of adjacent coils are substantially abutted.

6. A machine as in claim 1 in which the coils of each set are non-overlapping.

7. A machine as in claim 1 in which said magnet arrangement is formed by separate magnets and either said magnet arrangement or said coils have portions of varying radial width.

8. A machine as in claim 7 wherein either said coils or said magnets are tapered circumferentially to provide a narrower tip portion.

9. A machine as in claim 7 wherein said switching arrangement is operative to cause switching at the moment the narrower portion of each magnet is substantially opposite the center of a coil.

10. A machine as in claim 1 wherein said switching arrangement includes a timing device and sensor arrangement for synchronizing said switching with predetermined relative positions of said magnets and coils.

11. A machine as in claim 1 wherein said timing device is fixed relative to one of said rotor and stator elements, and said sensor arrangement includes a source and a sensor of said source, both fixed relative to the other of said elements, said timing device being adapted to permit or disrupt communication between said source and said sensor in correspondence with the relative positions of said elements.

12. A machine as in claim 1 wherein there are twice as many coils as magnets.

13. A machine as in claim 1 wherein the coils of the sets of said coil arrangement are offset by substantially the width of a coil.

14. A machine as in claim 1 wherein the sets of coils of said coil arrangement are offset by substantially one-half the width of a coil.

15. A machine as in claim 3 further including a second similar coil arrangement with said magnet arrangement between said two coil arrangements.

16. A machine as in claim 3 further including a second similar magnet arrangement, with said coil arrangement between said two magnet arrangements.

17. A machine as in claim 7 in which each coil has an area less than the area of each magnet.

18. A machine as in claim 7 in which said coils and magnets are relatively asymmetrical.

19. A machine as in claim 1 further including a circuit adapted to limit in-rush of current to said coils upon energization thereof.

20. A machine as in claim 7 wherein the magnetic interaction of one portion of said magnets with said coils differs from that of another portion as said magnets pass said coils to provide substantially uniform torque during such passage.

21. A machine as in claim 7 wherein said magnets are generally triangular in shape with a base extending generally radially and an axis extending generally circumferentially from said base toward a narrow tip.

22. A machine as in claim 1 wherein said coils are generally pie-segment shaped.

23. A machine as in claim 7 wherein said magnets are spaced in a substantially circular array.

24. A machine as in claim 1 wherein the coils of each set are substantially equally spaced in a circular array opposite said magnets.

25. A rotor for an electrical machine comprising at least one flat permanent magnet having a predetermined outline, and a non-magnetic disk having at least one opening, the number of openings corresponding to the number of magnets, each opening having the same outline as that of a magnet, with each magnet seated in its corresponding opening, and a plastic material on said disk between said magnets and providing a smooth reduced-air-friction surface for said disk.

26. A rotor for an electrical machine comprising at least one flat permanent magnet having a predetermined outline, and a non-magnetic disk having at least one opening, the number of openings corresponding to the number of magnets, each opening having the same outline as that of a magnet, with each magnet seated in its corresponding opening, and a ferro-magnetic plate juxtaposed to said disk.

* * * * *